United States Patent [19]

Bucchi

[11] Patent Number: 4,530,651
[45] Date of Patent: Jul. 23, 1985

[54] INSTALLATION FOR TREATING IN LONG KILNS WITH A HALF-DRY PROCESS WET SLURRIES OF RAW MATERIALS FOR THEIR CONVERSION INTO PORTLAND CEMENT CLINKER

[75] Inventor: Renato Bucchi, Bergamo, Italy

[73] Assignee: ITALCEMENTI Fabgriche Riunite Cemento S.p.A., Milan, Italy

[21] Appl. No.: 10,606

[22] Filed: Feb. 8, 1979

[30] Foreign Application Priority Data

Feb. 10, 1978 [IT]  Italy ................................ 20187 A/78

[51] Int. Cl.³ ............................................... B29C 1/00
[52] U.S. Cl. ......................................... 425/94; 106/100;
264/333; 425/6; 425/73; 425/84; 425/104;
432/18; 432/110; 432/246
[58] Field of Search ......................... 106/100; 264/333

[56] References Cited

U.S. PATENT DOCUMENTS

| 2,969,227 | 1/1961 | Ludwig .............................. 106/100 |
| 2,993,687 | 7/1961 | Gieskieng .......................... 106/100 |
| 3,324,208 | 6/1967 | Lyons ................................... 264/56 |
| 3,498,594 | 3/1970 | Rikhof ................................ 106/100 |
| 3,677,781 | 7/1972 | Hickelsen .......................... 106/100 |

*Primary Examiner*—Jeffery Thurlow
*Assistant Examiner*—Patrick Dailey
*Attorney, Agent, or Firm*—Charles A. Brown; Charles E. Brown

[57] ABSTRACT

An installation is disclosed for processing a wet slurry of raw materials for cement manufacture having from 28% to 45% of water, the installation comprising a horizontal centrifugal separator connected to an extruder which produces slugs of partially dewatered material which is then pelletized and fed to a rotary Portland cement kiln. The extruded slugs can be admixed with dry powdery material to prevent their sticking together and to introduce powdery dry material in the kiln.

3 Claims, 1 Drawing Figure

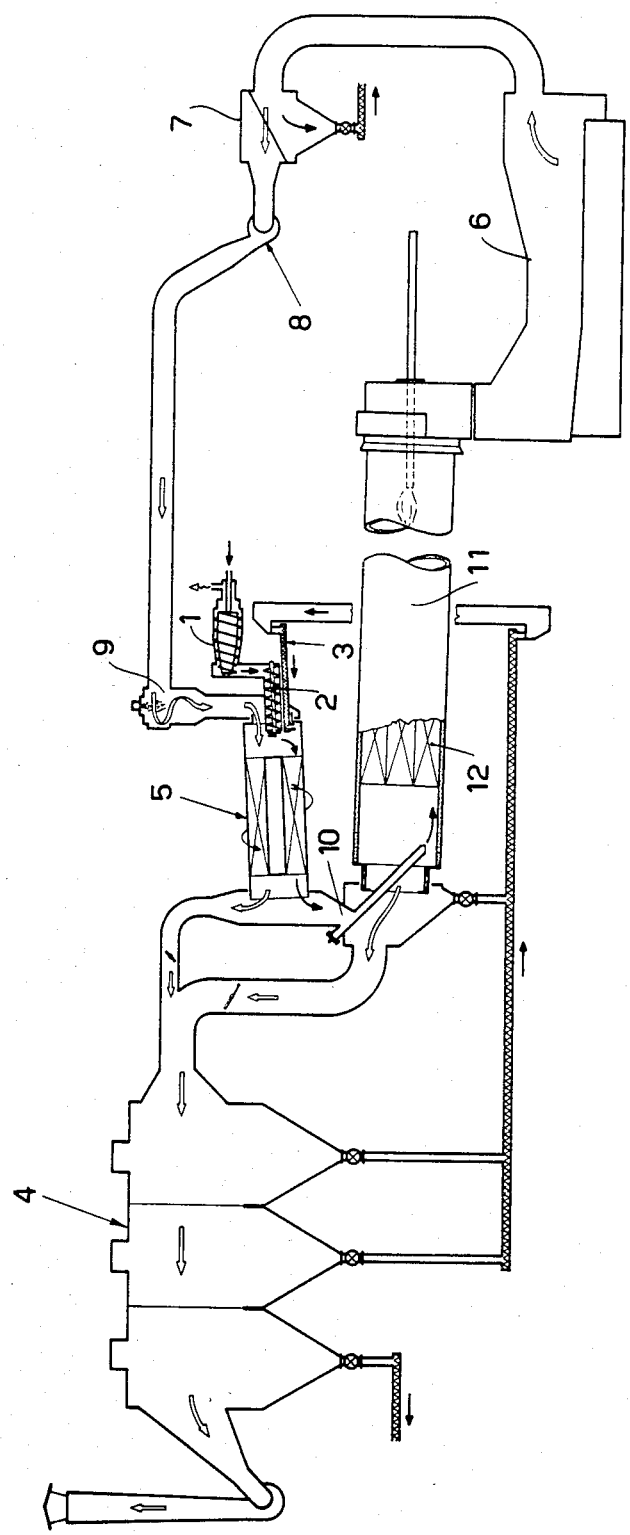

INSTALLATION FOR TREATING IN LONG KILNS WITH A HALF-DRY PROCESS WET SLURRIES OF RAW MATERIALS FOR THEIR CONVERSION INTO PORTLAND CEMENT CLINKER

In the technology for the manufacture of Portland cement there are known a number of installations which are adapted to preheat and to convert into clinker a dry mixture of raw materials for Portland cement which is fed in the form of a dry powder; the economy of fuel and the simplicity of construction of such installations are well known (dry-process kilns with suspension preheaters).

By virtue of their low fuel consumption, are likewise of interest in the kilns—both of the long type with internal criss-cross heat exchangers and of the reduced—length (ALC or Lepol types) having a traveling grate preheater and which are fed with pelletized feeds which are obtained by moisturizing with water a dry mixture of the raw materials in special devices called granulators (kilns with half-dry pelletized feed).

The exit gases of the "dry" kilns with suspension preheaters have a not negligible heat contents so that they can still be used sometimes in processes of drying of the raw materials with an overall economy which is still more advantageous. The half-dry pelletized feed kilns, conversely, have the advantage over the former kilns that they may achieve a higher degree of exploitation since their processing runs are less discontinuous.

All the methods outlined above for burning, both with the dry or the half-dry method, cannot be used with economically appreciable results when the naturally occurring moisture of the raw materials requires the so-called "wet process" (grinding and homogeneization), which requires the burning of an aqueous slurry of the ground mixture of the raw materials, the slurry containing from 28% to 45% of water, consistently with the nature of such raw materials, and thus a wasteful heat consumption which ranges from 1250 to 1600 kilocalories per kilogram of produced clinker.

There are still now in operation a number of modern and large size installations which, since they operate according to the principles recalled above and are thus wasteful in fuel consumption, would necessitate an appropriate conversion in order that their operation may become economically acceptable.

The suggestions and the attempts directed to spraying watery slurries of raw materials for Portland cement (28% to 45% of water, as obtained with the wet process) into the exit gas stream of a rotary kiln in order to effect a quick conversion into a dry powder (to be subsequently preheated in suspension and burned in a rotary kiln), meet with practical difficulties which have heretofore been a bar against the commercial exploitation of such a principle.

The mechanical demoisturizing methods for the watery slurries in question by filtration have met, conversely, with a rather widespread commercial success by the use of filter presses. These devices, however, require a not negligible upkeep burden and have the shortcoming that their operation is discontinuous or half-continuous so that additional appliances are required downstream thereof for the treatment, storage and metering of the thickened material having a residual moisture contents of from 18% to 22% of water in order to be able to feed it to the subsequent systems for the treatment, drying and burning.

These latter systems can be described as being of two basic types:

(a) a dryer which treats the thickened raw material by exploiting the heat of the kiln exit gases and/or the clinker cooler and/or any other heat source whatsoever, the material being converted into a dry powder which is then fed, as such, to a burning system fitted with suspension preheaters, (b) one or more shaping machines which convert the material which has been thickened by filtration into slugs having a length a few times multiple of the diameter and which are sent to a hopper wherefrom they feed a drying and burning system equipped with a traveling grate preheater.

Both approaches, however, have the defect that they operate according to a processing diagram which is not simple and that, in the case in which a conversion of an existing wet process kiln is contemplated, they require a radical modification of the installations (shortening the kiln length, erection of sturdy structures for supporting the suspension preheater or the traveling grate and otherwise) to such a degree that the conversion becomes in the majority of the cases economically objectionable.

This invention has for its object to provide an installation which is capable of affording an economically satisfactory solution for the problems outlined above and, more particularly, to the problem of modifying existing wet process long kilns into other kilns operating with a lower fuel consumption, which will be called hereinafter, for brief reference purposes, "pre-evaporated pellet long kilns".

The above referred object is achieved, according to the invention, by an installation for the treatment, in half-wet pelletized feed long kilns, of watery slurries of raw materials for cement to be converted into clinker, such installation comprising an apparatus for partially demoisturizing the watery slurries having a water contents of from 28% to 45%, at least a slug-forming machine for the thickened material and a system for drying and burning equipped with a preheater, the instant installation being characterized in that the demoisturizing assembly consists of at least one horizontal centrifugal separator directly connected to an extruder, a granulator evaporator being mounted directly at the outlet of the extruder, said granulator evaporator being fed together with the paste slugs coming from the extruder, with dry powdery material via a metering device, and that the outlet of the evaporator granulator is connected with the long rotary kiln equipped with internal heat exchangers.

In the installation according to the invention the watery slurry of the raw materials, which has been ground and homogeneized according to the conventional wet process, thus containing from 28% to 45% of water, is first proportioned and thickened to a moisture contents of from 18% to 22% by centrifuging in continuously operating machines having an operability which is much improved over that of the filter presses which are currently used at present in the cement industry.

The thickened paste thus obtained is directly fed to an extruder which is capable of forming slugs having a length equal to their diameter and of feeding them to another next device. In order to prevent that the fresh surfaces of the slugs come into contact and cause them to stick together, the slugs are immediately dusted by and admixed with powdery dry material which can be a fraction of that caught by the electrostatic filter of the burning system.

Concurrently, the initial moisture contents of the material (from 18% to 22% of water) is gradually reduced to as low as 9%–13% by evaporation and the slugs are converted into spheroidal pellets by a mechanical rolling action over a rapidly moving surface.

This operation, which can be dubbed a "pelletization by evaporation" is carried out continuously in the device indicated above which is composed by a cylindrical rotary body through which hot gases are caused to flow equicurrently with the slug-pellets, the gases having an appropriate heat contents as to their rate of flow and temperature and coming from the clinker cooler: they can possibly be supplemented by gases of the burning process and/or by any source of heat whatsoever.

The conveyance of heat and materials in the rotary cylindrical body of the evaporator-pelletizer is activated by internal exchangers which are capable of processing the materials without bumps and/or discontinuous slips in order to provide an even distribution of the material throughout the entire flow passage cross-section for the gases.

The material which has thus been pelletized by evaporation is fed to a long rotary kiln of conventional make, which is equipped along an appropriate length portion starting from its inlet, with an internal heat exchanger of the conventional criss-cross type which is capable of processing the pellets without bumps and/or discontinuous slids while concurrently affording an even distribution of the material throughout the entire flow passage cross-section for the gases.

The absence of bumps, sudden slips of discontinuous nature and free or almost free falls of the pellets during their motion in the interior of the exchanger prevents and/or reduces the disruption and/or distruction of such pellets and the formation of considerable volumes of dust which is intended to be drawn out of the kiln by the gases flowing therethrough.

The material of which the exchanger is made in the downmost section of the kiln, which thus intended to contact the hottest gases, is heat-resistant and thus adapted to be used in sections in which temperatures up to 1050° C.–1100° C. obtain.

In the kiln heat exchanger there are thus carried out the processes of final drying of the solid materials, of preheating and partial carbonate dissociation.

A possible embodiment of the combined installation for thickening the slurry, pelletization by evaporation and subsequent burning, according to the present invention, will now be described hereinafter with reference to the single FIGURE of the accompanying drawing.

The aqueous slurry, which contains from 28% to 45% of water, is proportioned in a horizontal centrifugal separator 1, demoisturized down to 18%–22% of water and then directly fed to a continuous extruder 2 which shapes paste slugs having a length approximately equal to the diameter. The slugs are then contacted by dry powdery material drawn from a portion of the dusts caught in the electrostatic filter 4 and metered by the device 3 to the interior of the evaporator-pelletizer cylinder 5.

To the device 5 converge, by the agency of the blower 8, hot air coming from the clinker cooler 6 (roughly stripped of dust in the gravity or centrifugal filter 7) and, possibly, hot gases produced in the chamber 9 by the combustion of any kind of fuel with a fraction of said hot air.

The pellets exiting the pelletizer evaporator cylinder 5 pass, through the feeding device 10, into the rotary kiln 11, the latter being equipped with internal criss-cross exchangers 12.

The as-produced clinker is then cooled in the cooler 6.

The principal advantages of the combined installation for thickening the slurry, pelletization by evaporation and burning of the aqueous slurry of cement raw materials according to this invention are the following.

The centrifugal separators 1, which operate in a continuous run, are combined as an entity with the extrusion machine and the pelletizer evaporator cylinder so as to fulfill the threefold function of paste feeders, air dampers and slurry thickeners for a slurry having a starting water contents of from 28% to 45%.

By adopting, conversely, the prior art methods with slurry thickeners, filter presses and others a batchwise discontinuous production run is carried out and the thus obtained cakes require that their size be reduced, that they be stored, weight proportioned and fed to the drying system through air dampers. The operation of the air dampers is always objectionable with a sticky material such as the thickened slurry often is and their unsatisfactory operation is invariably a burden for the thermal efficiency of the drying process due to the inflow of parasitic air streams.

The possibility is also afforded, if so desired, of exploiting a fraction of the sensible heat of the kiln exit gases.

It is thus extremely simple and economically remunerative to modify and convert existing conventional wet process long kilns which are wasteful as to heat consumption, into half-dry long kilns by installing the centrifugal thickener, extruder and pelletizer-evaporator cylinder assembly on the feeding end of the kiln and properly replacing the internal kiln exchangers in addition to installing the requested new pipings for the gas connections. By such modifications the fuel consumption of the kiln is reduced from the conventional 1250–1600 kilocalories per kilogram of produced clinker to not more than 920 kilocalories per kilogram of produced clinker.

I claim:

1. An installation for processing in existing wet process kilns converted to half dry process kilns wet slurries of raw materials for cement to be converted into clinkers, said installation comprising means for supplying watery slurries of raw material having a water content of from 28% to 45%, an apparatus for receiving and partially demoisturizing watery slurries, said apparatus including a horizontal centrifugal separator, an extruder connected to said separator for receiving partially demoisturized material from said separator and forming therefrom paste slugs, a dry powder proportioning device for supplying dry powder to paste slugs exiting said extruder to stiffen and demoisturize the paste slugs, and an evaporator for receiving dry powder coated paste slugs exiting from said extruder and further demoisturizing the paste slugs for delivery to converted existing wet process kilns, said installation including a converted existing wet process kiln having internal heat exchangers for receiving powdered and demoisturized paste slugs from said evaporator, said evaporator including a rotary cylinder through which, in equicurrent relationship with said paste slugs and the powdered material, hot gases flow.

2. An installation according to claim 1 wherein said rotary cylinder is equipped with internal heat exchangers.

3. An installation according to claim 2 wherein said heat exchangers internally of said evaporator and of said rotary kiln are of a construction to process the dust covered paste slugs without bumps and/or discontinuous sliding motions and to distribute the dust covered paste slugs evenly throughout the entire flow passage cross-section for the gases passing through said evaporator and said kiln.

* * * * *